(12) United States Patent
Plianos et al.

(10) Patent No.: US 11,007,880 B2
(45) Date of Patent: May 18, 2021

(54) METHOD AND APPARATUS FOR CONTROLLING ELECTRIC MACHINES

(71) Applicant: JAGUAR LAND ROVER LIMITED, Coventry (GB)

(72) Inventors: Alex Plianos, Coventry (GB); Matthew Hancock, Coventry (GB); Marco D'Amato, Coventry (GB); Minsuk Shin, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 148 days.

(21) Appl. No.: 16/141,626

(22) Filed: Sep. 25, 2018

(65) Prior Publication Data

US 2019/0092188 A1  Mar. 28, 2019

(30) Foreign Application Priority Data

Sep. 28, 2017 (GB) ..................................... 1715700

(51) Int. Cl.
*B60L 15/38* (2006.01)
*B60L 15/20* (2006.01)
(Continued)

(52) U.S. Cl.
CPC ........... *B60L 15/38* (2013.01); *B60L 15/2009* (2013.01); *B60L 15/2045* (2013.01);
(Continued)

(58) Field of Classification Search
None
See application file for complete search history.

(56) References Cited

U.S. PATENT DOCUMENTS 6,958,587 B1  10/2005  Naik
8,285,462 B2 *  10/2012  Heap ................... B60W 30/184
                                                                      701/54

(Continued)

FOREIGN PATENT DOCUMENTS

AT        513478 B1    6/2015
EP        2444273 A2   4/2012
(Continued)

OTHER PUBLICATIONS

Search Report, GB1715700.9, dated Jun. 26, 2018, 2 pages.
Search and Examination Report, GB1715700.9, dated Mar. 19, 2018, 9 pages.

*Primary Examiner* — Abdhesh K Jha
(74) *Attorney, Agent, or Firm* — McCoy Russell LLP (57) ABSTRACT

The present invention relates to a controller for controlling at least first and second propulsion units to generate a combined torque at least substantially equal to a total requested torque. At least first and second torque ranges are determined for each of the at least first and second propulsion units. The at least first and second torque ranges are determined to maintain dynamic stability of the vehicle. A total power cost is determined in dependence on an estimated power loss of the at least first and second propulsion units within said at least first and second torque ranges and a minimum value of the determined total power cost identified. The torque to be generated by each of said at least first and second propulsion units corresponding to the identified minimum value of the total power cost is determined. At least first and second control signals are generated to control said at least first and second propulsion units to generate the determined torque. The present invention also relates to a vehicle incorporating the controller and a related method.

19 Claims, 5 Drawing Sheets

(51) Int. Cl.
  *B60W 10/08* (2006.01)
  *B60W 10/10* (2012.01)
  *B60W 30/188* (2012.01)

(52) U.S. Cl.
  CPC ............ *B60W 10/08* (2013.01); *B60W 10/10* (2013.01); *B60W 30/188* (2013.01); *B60L 2220/42* (2013.01); *B60L 2240/421* (2013.01); *B60L 2240/423* (2013.01); *B60L 2240/425* (2013.01); *B60W 2510/081* (2013.01); *B60W 2510/087* (2013.01); *B60W 2710/083* (2013.01); *B60W 2720/403* (2013.01)

(56) References Cited

U.S. PATENT DOCUMENTS

| | | | | |
|---|---|---|---|---|
| 2009/0118884 A1* | 5/2009 | Heap | ............... | B60W 10/08 701/22 |
| 2009/0118918 A1* | 5/2009 | Heap | ............... | B60K 6/445 701/54 |
| 2009/0118943 A1* | 5/2009 | Heap | ............... | B60W 10/115 701/54 |
| 2009/0118963 A1* | 5/2009 | Heap | ............... | B60W 20/00 701/99 |
| 2014/0046523 A1* | 2/2014 | Lado | ............... | B60W 10/08 701/22 |
| 2014/0343077 A1 | 11/2014 | Sponheimer et al. | | |
| 2014/0346979 A1* | 11/2014 | Ota | ............... | H02P 27/08 318/51 |
| 2015/0298574 A1 | 10/2015 | Bramson | | |
| 2016/0009268 A1 | 1/2016 | Tamai et al. | | |
| 2017/0174097 A1 | 1/2017 | Gillespey et al. | | |
| 2018/0105157 A1* | 4/2018 | Wang | ............... | B60W 10/08 |
| 2019/0263413 A1* | 8/2019 | Hancock | ............... | B60K 1/00 |

FOREIGN PATENT DOCUMENTS

| | | |
|---|---|---|
| EP | 2738036 A2 | 6/2014 |
| GB | 2503725 A | 1/2014 |
| JP | 2004324613 A | 11/2004 |
| JP | 2015536128 A | 12/2015 |
| WO | 2012131953 A1 | 7/2014 |

* cited by examiner

METHOD AND APPARATUS FOR CONTROLLING ELECTRIC MACHINES

CROSS REFERENCE TO RELATED APPLICATION

This application claims priority to and the benefit of GB1715700.9 filed Sep. 28, 2017, which is incorporated by reference in its entirety.

TECHNICAL FIELD

The present disclosure relates to a method and apparatus for controlling electric machines. In particular, but not exclusively, the present disclosure relates to a method and apparatus for controlling the torque split between a plurality of electric machines. The method and apparatus have particular application in a vehicle for controlling the torque split between traction motors. Aspects of the invention relate to a controller for controlling at least first and second propulsion units, to a vehicle comprising a controller, to methods of controlling at least first and second propulsion units, and to a non-transitory computer-readable medium.

BACKGROUND

It is known to provide a battery electric vehicle (BEV) with at least one electric machine per axle for transmitting torque to at least one wheel per axle. By way of example, the vehicle may comprise a first electric machine for transmitting torque to a front axle; and a second electric machine for transmitting torque to a rear axle. This configuration offers various advantages in terms of performance, stability/traction, increased regenerative capacity during braking and overall efficiency. The torque distribution between the two axles is a non-trivial task that has to consider often conflicting attributes and constraints.

At least in certain embodiments, the current invention seeks to provide efficient control of a vehicle drivetrain.

SUMMARY OF THE INVENTION

Aspects of the present invention relate to a controller for controlling at least first and second propulsion units; a vehicle incorporating a controller; and a method of controlling at least first and second propulsion units as claimed in the appended claims.

According to a further aspect of the present invention there is provided a controller for controlling at least first and second propulsion units to generate a combined torque at least substantially equal to a total requested torque, the controller comprising a processor configured to:
  determine at least first and second torque ranges for each of the at least first and second propulsion units, said at least first and second torque ranges being determined to maintain dynamic stability of the vehicle;
  determine a total power cost in dependence on an estimated power loss of the at least first and second propulsion units within said at least first and second torque ranges;
  identify a minimum value of the determined total power cost;
  determine the torque to be generated by each of said at least first and second propulsion units corresponding to the identified minimum value of the total power cost; and
  generating at least first and second control signals for controlling said at least first and second propulsion units to generate the determined torque.

The controller determines a total power cost associated with a plurality of torque distributions between the at least first and second propulsion units. The total power cost may provide an indication of the efficiency of a particular torque split between said at least first and second propulsion units. The torque split corresponding to the minimum total power cost is determined and the first and second control signals generated to control the first and second propulsion units. Thus, at least in certain embodiments, the efficient operation of at least first and second propulsion units may be maintained.

The power loss for the at least first and second propulsion units may be estimated for one or more different torque distributions within said at least first and second torque ranges. In certain embodiments, the power loss may be estimated for a plurality of different torque distributions.

The first torque range may be defined by a first maximum value and a first minimum value. The first maximum value and the first minimum value are different from each other such that the first torque range is non-zero. The first maximum value and the first minimum value may be determined in dependence on a discrete first torque value, for example corresponding to a preferred or optimum first torque output to maintain dynamic stability. The first maximum torque may be determined by increasing the first torque value by a first prescribed amount; and the first minimum torque may be determined by decreasing the first torque value by a second prescribed amount. The first and second prescribed amounts may be the same as each other or may be different. The first and second prescribed amounts may be fixed. Alternatively, the first and second prescribed amounts may be variable, for example in dependence on vehicle dynamics. The second torque range may be defined by a second maximum value and a second minimum value. The second maximum value and the second minimum value are different from each other such that the second torque range is non-zero. The second maximum value and the second minimum value may be determined in dependence on a discrete second torque value, for example corresponding to a preferred or optimum second torque output to maintain dynamic stability. The second maximum torque may be determined by increasing the second torque value by the second prescribed amount (as applied when determining the first minimum torque); and the second minimum torque may be determined by decreasing the second torque value by the first prescribed amount (as applied when determining the first maximum torque).

The first and second prescribed amounts may be the same as each other or may be different. The first and second prescribed amounts may be fixed. The first and second prescribed amounts may be defined as a percentage of the total requested torque. The first and second prescribed amounts may, for example, be one more of the following set: 10%, 20%, 30%, 40%, 50%. The first and second prescribed amounts may be variable, for example in dependence on vehicle dynamics. Rather than increase or decrease the first and second torque values by the first and second prescribed amounts, the first and second torque values could be modified using other mathematical techniques, for example multiplication by complementary first and second factors to determine the respective maximum and minimum values of the first and second torque ranges.

The first and second torque values may represent a preferred torque distribution between the first and second propulsion units to maintain dynamic stability of the vehicle. The first and second torque values may be calculated using conventional stability control techniques. Alternatively, the first and second torque ranges may be calculated directly. The first and second torque ranges may be calculated in dependence on vehicle dynamics, such as longitudinal acceleration and/or lateral acceleration. The first and second torque ranges may be calculated in dependence on vehicle operating parameters, such as accelerator pedal position and/or brake pedal position. The first and second torque ranges may be calculated in dependence on a coefficient of friction ($\mu$) which may be estimated to provide an indication of the available traction.

The processor may be configured to determine at least first and second power loss penalties in dependence on current operating parameters of the at least first and second propulsion units.

The at least first and second propulsion units may each comprise an electric machine. The processor may be configured to determine the at least first and second power loss penalties in dependence on an operating temperature of the associated electric machine. The processor may be configured to determine when the operating temperature of each electric machine increases above one or more predetermined temperature thresholds.

The total power cost may be determined in dependence on the estimated power loss and the power loss penalties of each of said at least first and second propulsion units.

The torque may comprise an output torque and/or a regenerative torque.

The power loss of each of the at least first and second propulsion units may be estimated in dependence on one or more of the following set: an operating temperature of one or more components in the respective first and second propulsion units; an operating speed of the electric machine in the respective first and second propulsion units; a torque generated by the electric machine in the respective first and second propulsion units.

The at least first and second propulsion units may each comprise an inverter. The power loss of each inverter may be dependent on a high voltage (HV) battery bus voltage. The power loss of each of the at least first and second propulsion units may be estimated in dependence on HV battery bus voltage.

The processor may be configured to estimate the power loss of each of the at least first and second propulsion units at a plurality of intervals within the determined first and second torque ranges.

According to a further aspect of the present invention there is provided a controller for controlling at least first and second propulsion units to generate a combined torque at least substantially equal to a total requested torque, the first and second propulsion units comprising first and second electric machines respectively, the controller comprising a processor configured to:
  determine a first power loss penalty in dependence on a first operating temperature of the first electric machine;
  determine a second power loss penalty in dependence on a second operating temperature of the second electric machine;
  determine a total power cost in dependence on the first and second power loss penalties;
  identify a minimum value of the determined total power cost;
  determine the torque to be generated by each of said at least first and second propulsion units corresponding to the identified minimum value of the total power cost; and
  generating at least first and second control signals for controlling said at least first and second propulsion units to generate the determined torque.

The processor may be configured to determine when the operating temperature of each electric machine increases above one or more predetermined temperature thresholds.

The power loss of each of the at least first and second propulsion units may be estimated in dependence on the operating temperature and an operating speed.

The processor may be configured to determine at least first and second torque ranges for each of the at least first and second propulsion units, said at least first and second torque ranges being determined to maintain dynamic stability of the vehicle. An estimated power loss may be determined for the at least first and second propulsion units within said at least first and second torque ranges. The total power cost may be determined in dependence on the first and second power loss penalties and the estimated power loss within said at least first and second torque ranges.

The processor may be configured to estimate the power loss of each of the at least first and second propulsion units at a plurality of intervals within the determined first and second torque ranges.

The processor may be configured to estimate a power loss of each of the at least first and second propulsion units for each of a plurality of transmission drive ratios for one or more of said at least first and second propulsion units.

The processor may be configured to select a transmission drive ratio for one or more of said at least first and second propulsion units to provide the minimum total power cost.

The power loss of the at least first and second propulsion units may be estimated in dependence on a respective power loss map.

According to a further aspect of the present invention there is provided a controller for controlling at least first and second propulsion units to generate a combined torque at least substantially equal to a total requested torque, the controller comprising a processor configured to:
  determine a total power cost in dependence on an estimated power loss of the at least first and second propulsion units;
  identify a minimum value of the determined total power cost;
  determine the torque to be generated by each of said at least first and second propulsion units corresponding to the identified minimum value of the total power cost; and
  generating at least first and second control signals for controlling said at least first and second propulsion units to generate the determined torque.

According to a further aspect of the present invention there is provided a vehicle comprising a controller as described herein.

According to a further aspect of the present invention there is provided a method of controlling at least first and second propulsion units to generate a combined torque at least substantially equal to a total requested torque, the method comprising:
  determining at least first and second torque ranges for each of the at least first and second propulsion units, said at least first and second torque ranges being determined to maintain dynamic stability of the vehicle;

determining a total power cost in dependence on an estimated power loss of the at least first and second propulsion units within said at least first and second torque ranges;

identifying a minimum value of the determined total power cost;

determining the torque to be generated by each of said at least first and second propulsion units corresponding to the identified minimum value of the total power cost; and controlling said at least first and second propulsion units to generate the determined torque.

The method may comprise determining at least first and second power loss penalties in dependence on current operating parameters of the at least first and second propulsion units.

The at least first and second propulsion units each comprise an electric machine. The electric machine may be an electric traction machine. The method may comprise determining the at least first and second power loss penalties in dependence on an operating temperature of the associated electric machine.

The method may comprise determining when the operating temperature of each electric machine increases above one or more predetermined temperature thresholds.

The total power cost may be determined in dependence on the estimated power loss and the power loss penalties of each of said at least first and second propulsion units.

The torque may comprise an output torque and/or a regenerative torque.

The power loss of each of the at least first and second propulsion units may be estimated in dependence on one or more of the following set: an operating temperature; an operating speed; and a motor torque.

The method may comprise estimating the power loss of each of the at least first and second propulsion units at a plurality of intervals within the determined first and second torque ranges.

According to a further aspect of the present invention there is provided a method of controlling at least first and second propulsion units to generate a combined torque at least substantially equal to a total requested torque, the first and second propulsion units comprising first and second electric machines respectively, the method comprising:

determining a first power loss penalty in dependence on a first operating temperature of the first electric machine;

determining a second power loss penalty in dependence on a second operating temperature of the second electric machine;

determining a total power cost in dependence on the first and second power loss penalties;

identifying a minimum value of the determined total power cost;

determining the torque to be generated by each of said at least first and second propulsion units corresponding to the identified minimum value of the total power cost; and controlling said at least first and second propulsion units to generate the determined torque.

The method may comprise determining when the operating temperature of each electric machine increases above one or more predetermined temperature thresholds.

The power loss of each of the at least first and second propulsion units may be estimated in dependence on the operating temperature in combination with one or more of the following set: an operating speed and a motor torque.

The method may comprise determining at least first and second torque ranges for each of the at least first and second propulsion units, said at least first and second torque ranges being determined to maintain dynamic stability of the vehicle. A power loss of the at least first and second propulsion units may be estimated within said at least first and second torque ranges. The total power cost may be determined in dependence on the first and second power loss penalties and the estimated power loss within said at least first and second torque ranges.

The method may comprise estimating the power loss of each of the at least first and second propulsion units at a plurality of intervals within the determined first and second torque ranges.

The method may comprise estimating a power loss of each of the at least first and second propulsion units for each of a plurality of transmission drive ratios for one or more of said at least first and second propulsion units.

The method may comprise selecting a transmission drive ratio for one or more of said at least first and second propulsion units to provide the minimum total power cost.

The power loss of the at least first and second propulsion units may be estimated in dependence on a respective power loss map.

According to a further aspect of the present invention there is provided a non-transitory computer-readable medium having a set of instructions stored therein which, when executed, cause a processor to perform the method described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION OF THE EMBODIMENTS

Figure 1:
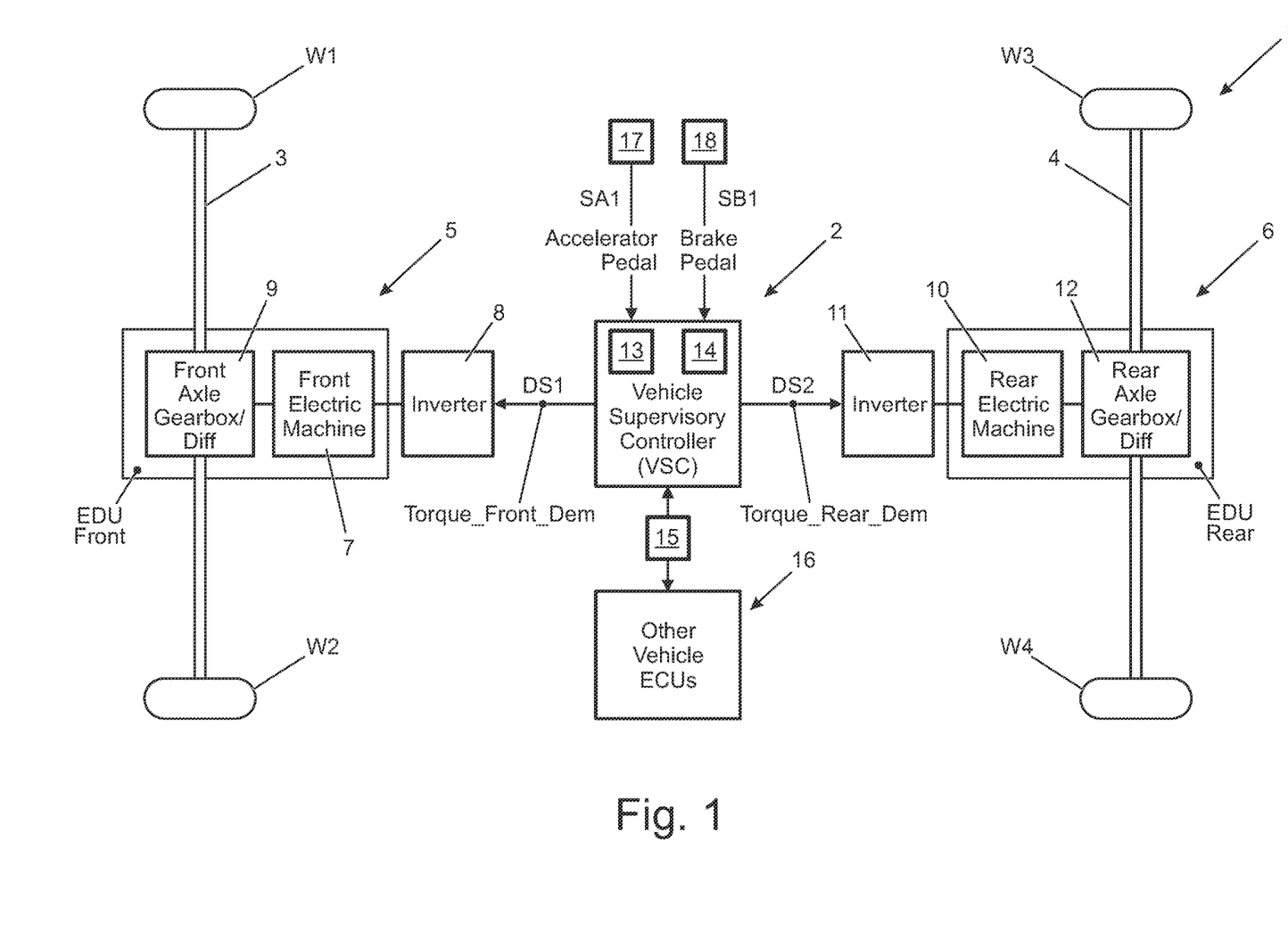
FIG. 1 shows a schematic representation of a vehicle incorporating a controller for controlling a torque split between first and second electric machines in accordance with an aspect of the present invention.

A vehicle 1 incorporating a controller 2 in accordance with an aspect of the present invention will now be described with reference to the accompanying figures. The vehicle 1 in the present embodiment is a battery electric vehicle, but the techniques and apparatus described herein are applicable in other types of vehicle, such as a hybrid electric vehicle (HEV) or plug-in hybrid electric vehicle (PHEV). As shown in FIG. 1, the vehicle 1 in the present embodiment has four wheels W1-4 mounted on front and rear axles 3, 4. The vehicle 1 in the present embodiment is a four-wheel drive vehicle and, in use, torque is selectively transmitted to each of the wheels W1-4 to propel the vehicle 1. The vehicle 1 may, for example, be an automobile, a utility vehicle or a sports utility vehicle.

The vehicle 1 comprises a first propulsion unit 5 for transmitting a first torque T1 to the front axle 3; and a second propulsion unit 6 for transmitting a second torque T2 to the rear axle 4. In the present embodiment, the first propulsion unit 5 is operable to transmit a front torque to the front wheels W1, W2 of the vehicle 1; and the second propulsion unit 6 is operable to transmit a rear torque to the rear wheels W3, W4 of the vehicle 1. The term "front torque" used herein refers to the torque applied at the front axle 3; and the term "rear torque" used herein refers to the torque applied at the rear axle 4. The first and second propulsion units 5, 6 are operative to generate complementary front and rear torques TQ1, TQ2. The aggregate of the front and rear torques TQ1, TQ2 is at least substantially equal to a total requested torque TQ. The front and rear torques TQ1, TQ2 may be expressed as a percentage of the total requested torque TQ. The front and rear torques TQ1, TQ2 are complementary and, when combined, are at least substantially equal to the total requested torque TQ (i.e. 100%). The total requested torque TQ may be generated in dependence on a driver torque request.

The first propulsion unit 5 comprises a first electric machine 7, a first inverter 8 and a first gearbox/differential 9. The second propulsion unit 6 comprises a second electric machine 10, a second inverter 11 and a second gearbox/differential 12. The first and second electric machines 7, 10 are traction motors for generating torque to propel the vehicle 1. The first and second electric machines 7, 10 each comprise a rotor and a stator (not shown). The first and second inverters 8, 11 are connected to a traction battery (not shown) for supplying power to the first and second electric machines 7, 10. The first and second inverters 8, 11 also perform DC to AC conversion for AC motors. The controller 2 is configured to output front and rear torque demand signals DS1, DS2 to control operation of the first and second propulsion units 5, 6. As described herein, the front and rear torque demand signals DS1, DS2 control operation of the first and second electric machines 7, 10. The controller 2 may thereby control the first and second torques T1, T2 transmitted to the front and rear axles 3, 4.

The controller 2 comprises an electronic processor 13 coupled to a memory device 14. The memory device 14 comprises a set of non-transitory instructions which, when executed, cause the electronic processor 13 to perform the method(s) described herein. The controller 2 is connected to an interface 15, such as a communication bus, to communicate with electronic control units (ECUs) provided in the vehicle 1. The ECUs are denoted generally by the reference numeral 16 in FIG. 1. The controller 2 is configured to receive an accelerator signal SA1 from an accelerator pedal sensor 17 associated with an accelerator pedal (not shown) provided in the vehicle 1. The controller 2 is configured also to receive a brake signal SB1 from a brake pedal sensor 18 associated with a brake pedal (not shown) provided in the vehicle 1.

Figure 2:
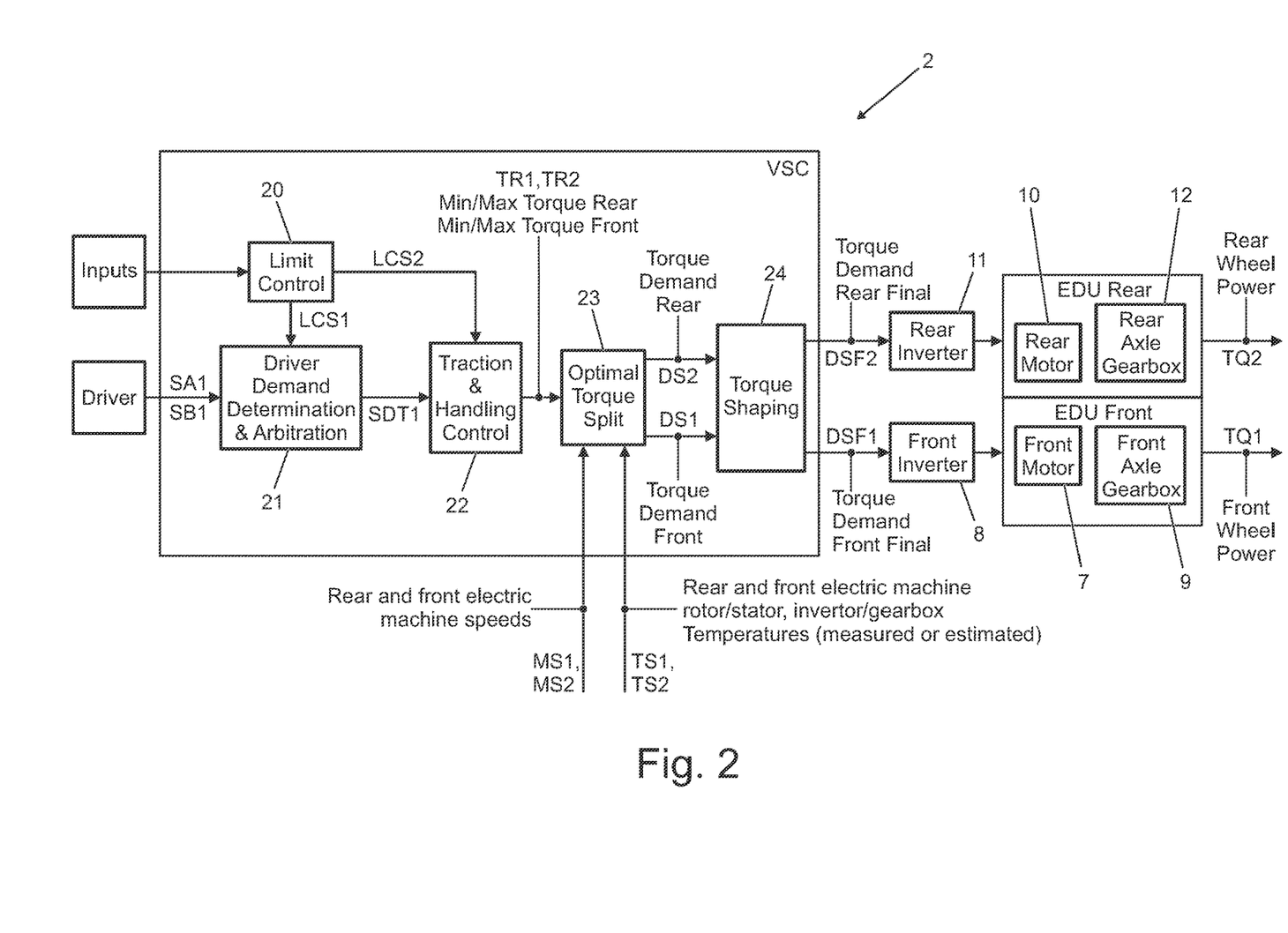
FIG. 2 shows a block diagram illustrating the relationship between the controller and the first and second electric machines shown in FIG. 1.

A schematic representation of the controller 2 is shown in FIG. 2. The controller 2 is configured to implement a limit control module 20, a driver demand determination and arbitration module 21, a traction and handling control module 22, a torque split module 23, and a torque shaping module 24. The limit control module 20 receives maximum and minimum limits from controllers (not shown) associated with the first and second inverters 8, 11. In some applications, the limit control module 20 may receive a pair of inverter limits for each of the first and second electric machines 7, 10 to describe peak capability (i.e. motor/inverter capability for a short duration of time) and continuous capability (i.e. motor/inverter capability for indefinite operation). The limit control module 20 also receives a power limit from the traction battery and converts this to an equivalent torque limit for each of the first and second electric machines 7, 10, for example by partitioning the power limit according to a current torque split between said first and second electric machines 7, 10. The limit control module 20 may generate a maximum and minimum limit for each of the first and second electric machines 7, 10 in dependence on one or more of these limits. The limit control module 20 generates first and second limit control signals LCS1, LCS2. The first limit control signal LCS1 represents the combined powertrain maximum and minimum limits. The second limit control signal LCS2 comprises maximum and minimum limits for each of the first and second electric machines 7, 10 at the wheel frame of reference, i.e. actuator limits converted to wheel frame of reference by accounting for the transmission ratio and losses.

The first and second limit control signals LCS1, LCS2 are output to the driver demand determination and arbitration module 21 and the traction and handling control module 22 respectively. The driver demand determination and arbitration module 21 receives driver inputs, including the accelerator signal SA1 and the brake signal SB1. The driver demand determination and arbitration module 21 is operative to generate a torque demand signal SDT1 in dependence on the accelerator signal SA1 and the brake signal SB1. The torque demand signal SDT1 comprises a total requested torque TQ to be transmitted to the front and rear axles 3, 4 as a traction torque or a regenerative torque. The total requested torque may be a positive (accelerating) torque (+ve) for transmitting a drive torque to the wheels W1-4; or a negative (braking) torque (−ve) for transmitting a braking or regenerative torque to the wheels W1-4. It will be understood that the vehicle 1 may decelerate if the positive (+ve) torque request is less than the overall vehicle losses, which may occur, for example, when the vehicle 1 is ascending a gradient. Conversely, the vehicle 1 may accelerate if the negative (−ve) torque request is less than the overall vehicle gains, which may occur, for example, when the vehicle 1 is descending a gradient. The total requested torque TQ may be generated in dependence on a cruise control system or an adaptive cruise control system. The present invention may be implemented in conjunction with an autonomous or semi-autonomous control module(s) which may at least generate the total requested torque TQ. The torque demand signal SDT1 is output to the traction and handling control module 22. The torque split module 23 is operative to control the torque transmitted to the front and rear axles 3, 4 to meet the total requested torque TQ.

The traction and handling control module 22 is configured to determine a torque distribution between the front and rear axles 3, 4 (i.e. a torque split between the front and rear axles 3, 4) suitable for maintaining dynamic stability of the vehicle 1. The traction and handling control module 22 is configured to determine first and second torque ranges TR1, TR2 which define respective first and second ranges of the torque to be transmitted to the front and rear axles 3, 4 respectively. The first torque range TR1 may comprise a minimum value TQ1(MIN) and a maximum value TQ1(MAX); and the second torque range TR2 may comprise a minimum value TQ2(MIN) and a maximum value TQ2(MAX). The first and second torque ranges TR1, TR2 in the present embodiment are expressed as a percentage of the total requested torque TQ. In alternative embodiments, the first and second torque ranges TR1, TR2 may be expressed as torque values. The minimum value TQ1(MIN) of the first torque range TR1 and the minimum value of the second torque range TQ2(MIN) are both greater than or equal to zero (0) when the total requested torque TQ is greater than or equal to zero (0). The maximum value TQ1(MAX) of the first torque range TR1 and the maximum value of the second torque range TQ2(MAX) are both less than or equal to zero (0) when the total requested torque TQ is less than or equal to zero (0). The front and rear torques TQ1, TQ2 are complementary and, when combined, are at least substantially equal to the total requested torque TQ (i.e. 100%). The first and second torque ranges TR1, TR2 may be predefined, for example in dependence on detected operating conditions or driving modes. The traction and handling control module 22 combines the first and second limit control signals LCS1, LCS2 from the limit control module 20 with internally generated limits for stability and/or traction. Examples of traction and handling control include:

Pedal Position

The traction and handling control module 22 may determine the torque distribution between the front and rear axles 3, 4 in dependence on the accelerator pedal position and/or the brake pedal position. The traction and handling control module 22 may determine the extent of the first torque range TR1 and/or the second torque range TR2 in dependence on the accelerator pedal position and/or the brake pedal position. By way of example, the extent of the first and second torque ranges TR1, TR2 may be inversely proportional to a magnitude of the brake torque request generated by depressing the brake pedal. Alternatively, or in addition, the traction and handling control module 22 may determine the extent of the first and second torque ranges TR1, TR2 in dependence on the rate of change of the accelerator pedal position and/or the brake pedal position. The extent of the first and second torque ranges TR1, TR2 may be inversely proportional to a brake torque request generated by depressing the brake pedal. Any changes made to the torque distribution and/or the extent of the first and second torque ranges TRT1, TR2 may be made progressively.

Vehicle Dynamics

The traction and handling control module 22 may determine the torque distribution between the front and rear axles 3, 4 in dependence on the longitudinal acceleration and/or lateral acceleration of the vehicle 1. The traction and handling control module 22 may determine the extent of the first and second torque ranges TR1, TR2 in dependence on the longitudinal acceleration and/or lateral acceleration of the vehicle 1. Alternatively, or in addition, the traction and handling control module 22 may determine the extent of the first and second torque ranges TR1, TR2 in dependence on the rate of change of the longitudinal acceleration and/or lateral acceleration of the vehicle 1. The extent of the first and second torque ranges TR1, TR2 may be inversely proportional to the longitudinal acceleration and/or lateral acceleration. Any changes made to the torque distribution and/or the extent of the first and second torque ranges TRT1, TR2 may be made progressively. By way of example, at low longitudinal and lateral acceleration, the traction and handling control module 22 may allow 20-80%/80-20% front/rear torque distribution. In this scenario, the first torque range TR1 may comprise a minimum value TQ1(MIN) of 20% of the total requested torque TQ and a maximum value TQ1(MAX) of 80% of the total requested torque TQ; and the second torque range TR2 may comprise a minimum value TQ2(MIN) of 20% of the total requested torque TQ and a maximum value TQ1(MAX) of 80% of the total requested torque TQ. The traction and handling control module 22 may restrict the front-torque distribution. At high longitudinal and lateral accelerations, the extent of the first and second torque ranges TR1, TR2 may be reduced, for example to 70-100%/30-0% front/rear torque distribution. In this scenario, the first torque range TR1 may comprise a minimum value TQ1(MIN) of 70% of the total requested torque TQ and a maximum value TQ1(MAX) of 100% of the total requested torque TQ; and the second torque range TR2 may comprise a minimum value TQ2(MIN) of 0% of the total requested torque TQ and a maximum value TQ1(MAX) of 30% of the total requested torque TQ. Any changes made to the torque distribution and/or the extent of the first and second torque ranges TRT1, TR2 may be made progressively. It will be understood that the first and second torque ranges TR1, TR2 are non-zero. In certain scenarios, the traction and handling control module 22 may specify a discrete ratio for the front/rear torque distribution; this is outside the scope of at least certain aspects of the present invention.

Estimated Coefficient of Friction ($\mu$)

The traction and handling control module 22 may estimate a coefficient of friction ($\mu$) of the surface under the wheels W1-4 of the vehicle 1. The traction and handling control module 22 may control the torque distribution between the front and rear axles 3, 4 in dependence on the estimated coefficient of friction (p). The traction and handling control module 22 may change the extent of the first and second torque ranges TR1, TR2 in dependence on changes in the longitudinal acceleration and/or lateral acceleration.

The traction and handling control module 22 may allow a 0-100%/100-0% front/rear torque distribution on a surface having a high coefficient of friction (μ), for example during cruising and or medium/low accelerations. In this scenario, the first torque range TR1 may comprise a minimum value TQ1(MIN) of 0% and a maximum value TQ1(MAX) of 100%; and the second torque range TR2 may comprise a minimum value TQ2(MIN) of 0% and a maximum value TQ2(MAX) of 100%. The traction and handling control module 22 may enable a 40-60%/60-40% front/rear torque distribution on a surface having a low coefficient of friction (0, such as a slippery road surface (for example rice). In this scenario, the first torque range TR1 may comprise a minimum value TQ1(MIN) of 40% and a maximum value TQ1(MAX) of 60%; and the second torque range TR2 may comprise a minimum value TQ2(MIN) of 40% and a maximum value TQ2(MAX) of 60%. Other first and second torque ranges TR1, TR2 may usefully be employed. Any changes made to the torque distribution and/or the extent of the first and second torque ranges TRT1, TR2 may be made progressively.

The first and second torque ranges TR1, TR2 each define minimum and maximum torque limits for the first and second propulsion units 5, 6. Thus, the first torque range TR1 defines a minimum front torque and a maximum front torque for transmission to the front axle 3; and the second torque range TR2 defines a minimum rear torque and a maximum rear torque for transmission to the rear axle 4. The first torque range TR1 and/or the second torque range TR2 may comprise a static, pre-defined torque range for the respective first and second electric machines 7, 10, for example −3000 Nm to +3000 Nm with 10 Nm steps. Alternatively, or in addition, the first torque range TR1 and/or the second torque range TR2 may be capped by a minimum/maximum torque limit, for example dependent on an operating speed SPEED1, SPEED2 of the respective first and second electric machines 7, 10. Alternatively, or in addition, the first torque range TR1 and/or the second torque range TR2 may be determined in dependence on operating limits, for example one or more of the following set: traction battery power limit, inverter limits and transmission limits. Alternatively, or in addition, the first torque range TR1 and/or the second torque range TR2 may be determined to maintain dynamic stability of the vehicle. At least in certain embodiments, the first and second torque ranges TR1, TR2 may be dynamic ranges and may vary in dependence on current or predicted operating conditions.

The first and second torque ranges TR1, TR2 are output to the torque split module 23. The torque split module 23 is operative to control the torque transmitted to the front and rear axles 3, 4 to meet the total requested torque TQ. The torque split module 23 is operative to optimise the efficiency of the first and second electric machines 7, 10 within the first and second torque ranges TR1, TR2. In certain embodiments, the torque split module 23 may be configured to optimise the overall combined efficiency of the first and second propulsion units 3, 4, for example considering the operating efficiencies of the first and second inverters 8, 11 and/or the first and second gearbox/differentials 9, 12. As described herein, the torque split module 23 is configured to generate the front and rear torque demand signals DS1, DS2 to control operation of the first and second electric machines 7, 10. The front torque demand signal DS1 comprises a front torque request TQ1 for the first electric machine 7; and the rear torque rear torque demand signal DS2 comprises a rear torque request TQ2 for the second electric machine 10. The aggregate of each complementary pair of front and rear torque requests TQ1, TQ2 is at least substantially equal to the total requested torque TQ. The torque split module 23 is configured to receive first and second motor speed signals MS1, MS2. The torque split module 23 is also configured to receive first and second temperature signals TS1, TS2 relating to the respective first and second propulsion units 5, 6. The first temperature signal TS1 comprises one or more of the following set: a temperature of the first electric machine 7 (rotor and/or stator temperature); a temperature of the first inverter 8, and a temperature of the first gearbox/differential 9. The second temperature signal TS2 comprises one or more of the following set: a temperature of the second electric machine 10 (rotor and/or stator temperature); a temperature of the second inverter 11; and a temperature of the second gearbox/differential 12. The first temperature signal TS1 and/or the second temperature signal TS2 may be measured by one or more sensors (not shown) coupled to the respective components. Alternatively, the first temperature signal TS1 and/or the second temperature signal TS2 may be estimated by respective thermal models, for example in dependence on operating conditions or loads of the respective components. The operation of the torque split module 23 to generate the front and rear torque demand signals DS1, DS2 as described in more detail below with reference to FIG. 3.

The front and rear torque demand signals DS1, DS2 are output to the torque shaping module 24. The torque shaping module 24 is configured to re-profile the front and rear torque demand signals DS1, DS2 and to generate front and rear final torque demand signals DSF1, DSF2 which are output to the respective first and second inverters 8, 11. The first and second inverters 8, 11 control operation of the first and second electric machines 7, 10 in dependence on said front and rear final torque demand signals DSF1, DSF2. As outlined above, the first and second electric machines 7, 10 may generate a positive torque for propelling the vehicle 1 or a negative torque to slow the vehicle 1. The first and second electric machine 7, 10 may be configured to regenerate energy under braking, for example to recharge the traction battery.

The torque split module 23 is configured to determine a total power cost TPC associated with operating the first and second electric machines 7, 10 to generate varying proportions of the total requested torque TQ. The total power cost TPC provides an indication of the overall efficiency of the first and second propulsion units 5, 6. The torque split module 23 identifies when the total power cost TPC is at a minimum and determines the corresponding torque split between the first and second propulsion units 5, 6. The front and rear torque demand signals DS1, DS2 are generated such that the front and rear torque requests TQ1, TQ2 correspond to the determined torque split. The operation of the torque split module 23 will now be described in more detail with reference to a flow diagram 100 shown in FIG. 3.

Figure 3:
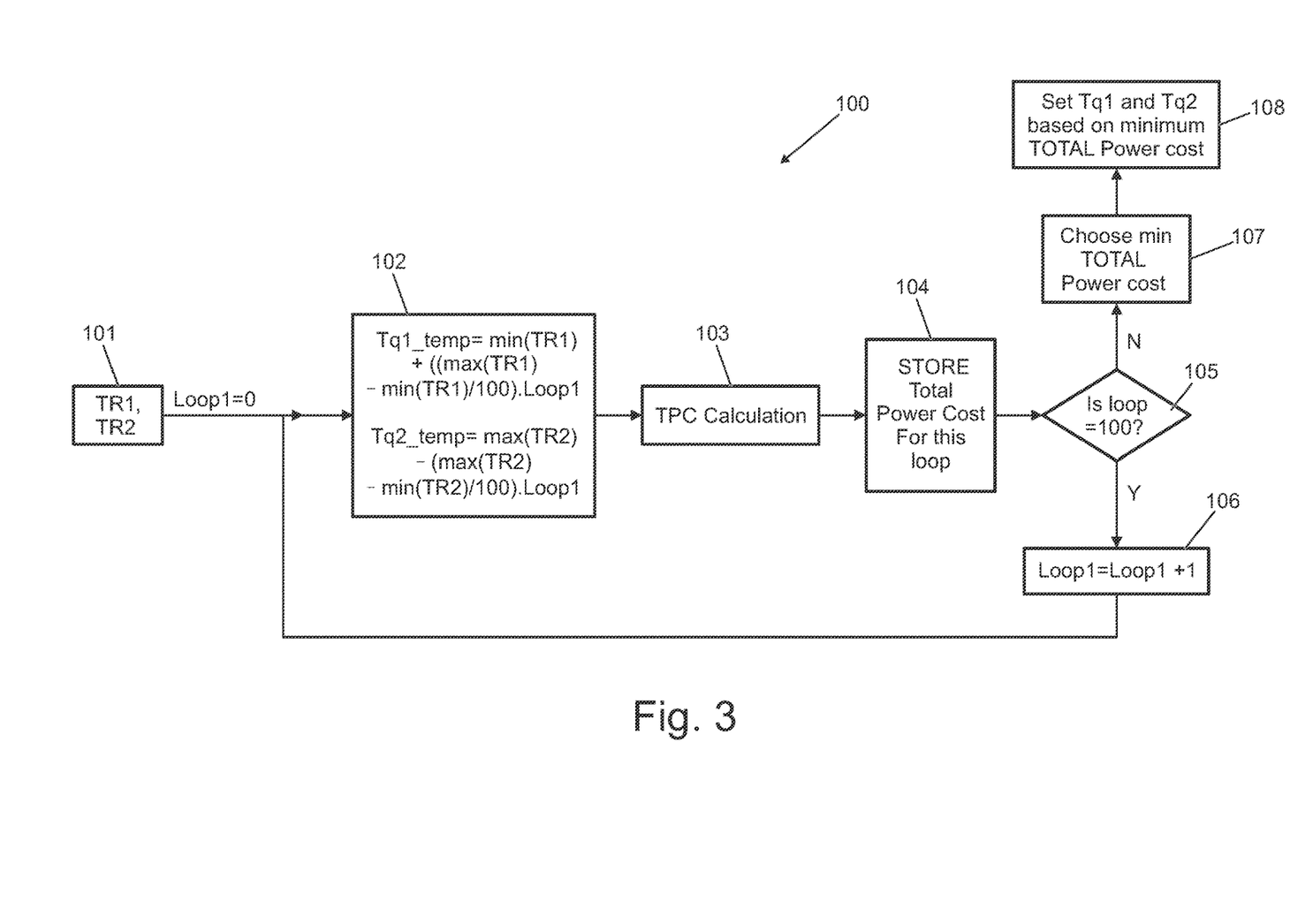
FIG. 3 shows a flow diagram illustrating the operation of a torque split module to determine a front and rear torque split through iterative analysis.

The torque split module 23 receives the first and second torque ranges TR1, TR2 (block 101). A loop procedure is initiated (block 102) to determine the optimum torque split between the first and second propulsion units 5, 6 to meet the total requested torque TQ. The TPC is calculated for a plurality of different torque splits within the first and second torque ranges TR1, TR2. The relationship between the total requested torque TQ and the first and second torque ranges TR1, TR2 is defined by the following equation:

$$TQ=\min(TR1)+\max(TR2)=\min(TR2)+\max(TR1) \quad (1)$$

Within each cycle of the loop procedure, a temporary front torque request TQ1_TEMP is defined by the following equation:

$$TQ1\_TEMP=\min(TR1)+((\max(TR1)-\min(TR1))/100) \cdot Loop1 \quad (2)$$

Where Loop1 is a loop counter variable which is incremented each time the loop procedure is completed (block 106).

Within each cycle of the loop procedure, a temporary rear torque request TQ2_TEMP is defined by the following equation:

$$TQ2\_TEMP=\max(TR2)-(\max(TR2)-\min(TR2)/100) \cdot Loop1 \quad (3)$$

Where Loop1 is a loop counter variable which is incremented each time the loop procedure is completed (block 106).

The TPC is calculated (block 103) for a prescribed torque split in each cycle of the loop procedure. The torque split in each cycle is determined in dependence on the loop counter variable LOOP1. In the next cycle of the loop procedure, the loop counter variable LOOP1 is incremented to change the prescribed torque split between the first and second propulsion units 5, 6, for example by increasing the temporary front torque request TQ1_TEMP by a predetermined interval and decreasing the temporary rear torque request TQ2_TEMP by the same predetermined interval. The calculated TPC is stored in respect of each cycle of the loop procedure (block 104). The loop procedure is repeated until the TPC is determined for a plurality of intervals across the prescribed operating range. In the present embodiment, the predetermined interval is 1% and the loop is repeated one hundred (100) times to determine the total power cost TPC across the full operating range of the first and second propulsion units 5, 6. After each TPC calculation, a check is performed to determine if the TPC calculation has been performed across the prescribed range (block 105). If the TPC calculation is not complete, a loop counter (Loop1) is incremented (block 106) and the next cycle of the loop procedure performed. If the TPC calculation is complete, the minimum TPC calculated during the loop procedure is selected (block 107). The front torque request TQ1 and the rear torque request TQ2 are set based on the torque split which resulted in the minimum TPC calculation (block 108). The front and rear torque demand signals DS1, DS2 are generated and output to the torque shaping module 24. The torque split module 23 described herein iteratively determines the TPC across the prescribed operating range and facilitates selection of the torque split corresponding to the minimum TPC. The front and rear torque requests TQ1, TQ2 are set in dependence on the temporary front and rear torque requests TQ1_TEMP, TQ2_TEMP identified as providing the minimum TPC within the first and second torque ranges TR1, TR2. By selecting the minimum TPC, the first and second propulsion units 5, 6 may operate more efficiently than prior art arrangements to reduce the total power consumption.

Figure 4:
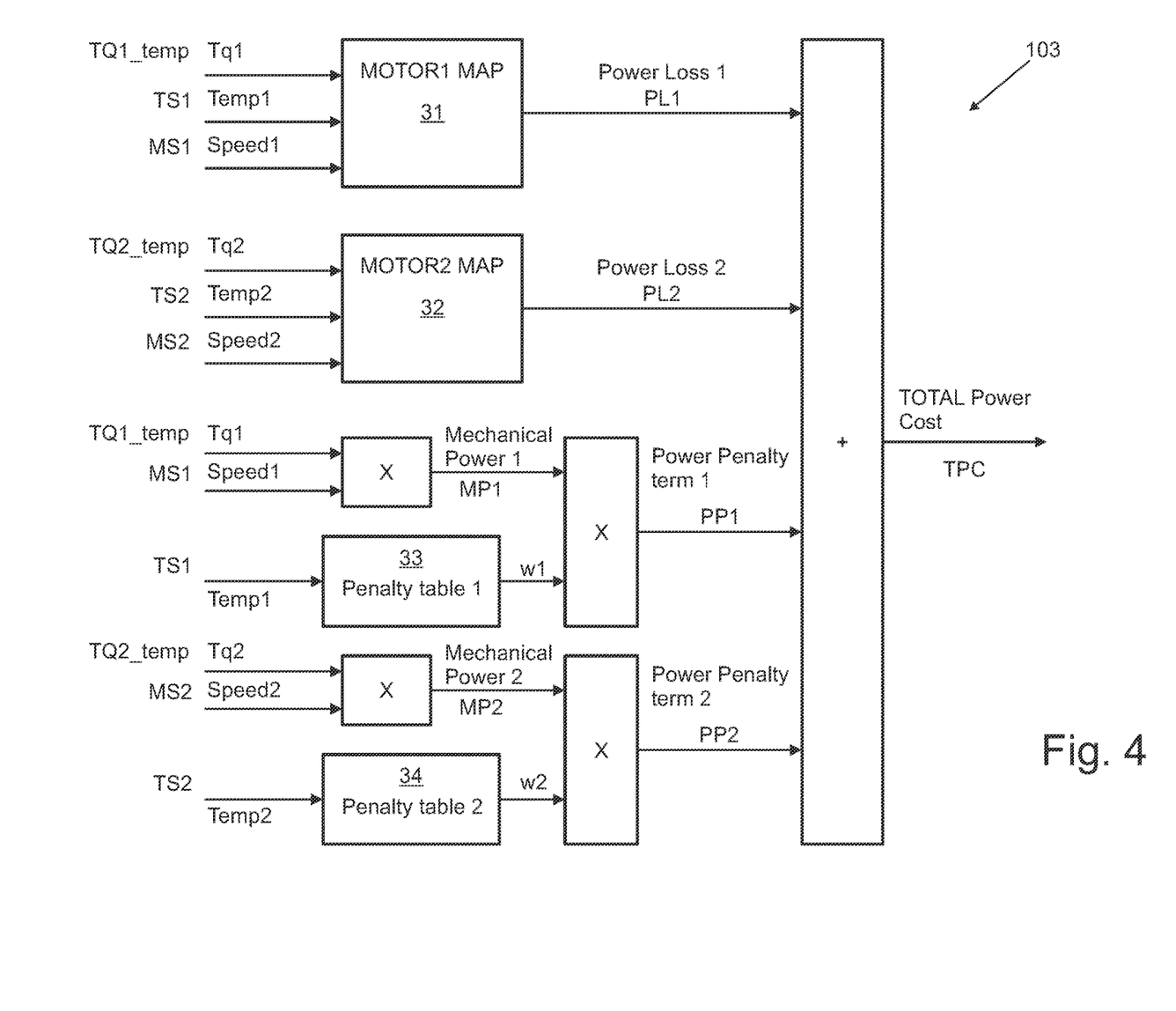
FIG. 4 shows a schematic representation of the operation of the torque split module shown in FIG. 3 to calculate a total power cost associated with a particular front and rear torque split.
Figure 5:
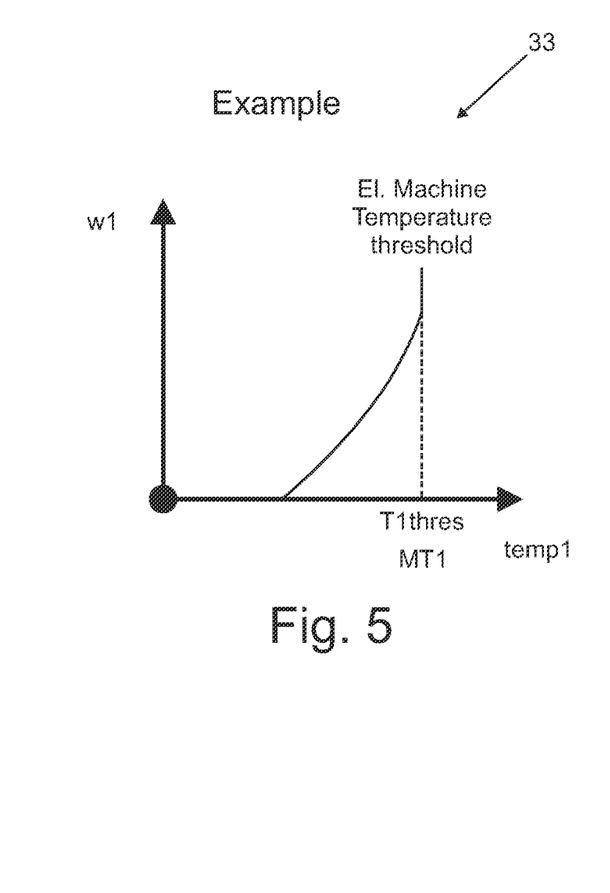
FIG. 5 shows a chart representing a motor map illustrating the power losses of an electric machine with reference to operating speed and torque.
Figure 6:
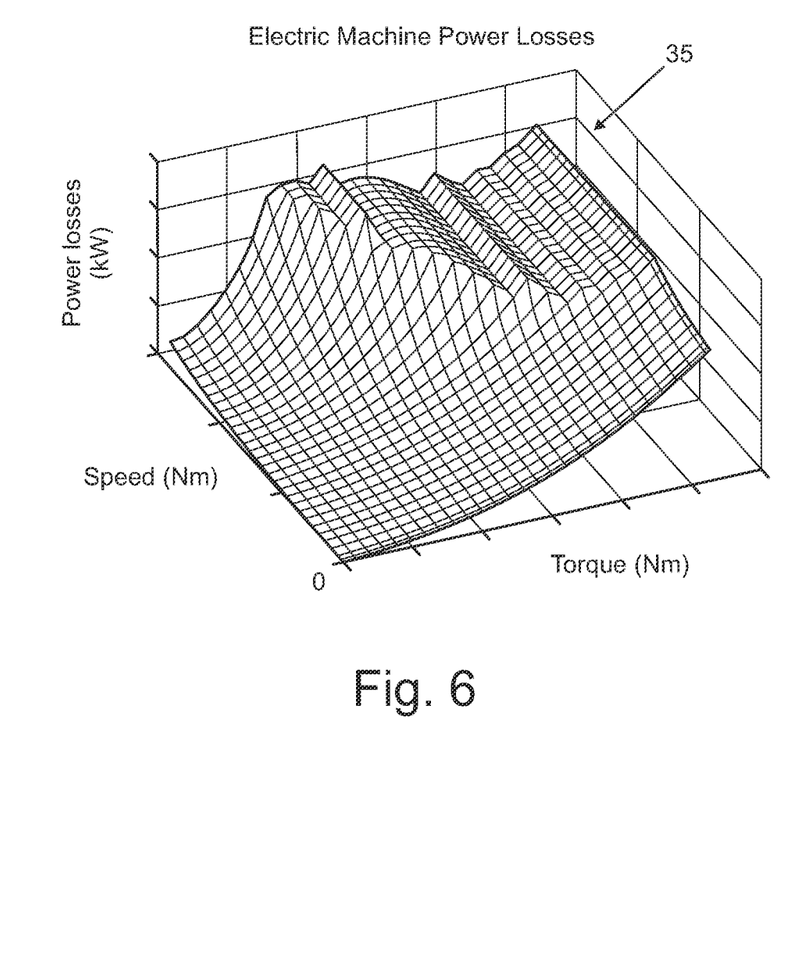
FIG. 6 shows a chart representing a penalty table for calculating a penalty power loss based on an operating temperature of the first electric machine.

The calculation of the TPC will now be described with reference to a block diagram 30 shown in FIG. 4. The TPC calculation references a first motor map 31, a second motor map 32, a first penalty table 33 and a second penalty table 34. The first motor map 31 defines a first power loss PL1 for the first electric machine 7 in dependence on the temporary front torque request TQ1_TEMP, the temperature of the first electric machine 7 (determined by the first temperature signal TS1) and the operating speed SPEED1 of the first electric machine 7 (determined by the first motor speed signal MS1). The second motor map 32 defines a second power loss PL2 for the second electric machine 10 in dependence on the temporary rear torque request TQ2_TEMP, the temperature of the second electric machine 10 (determined by the second temperature signal TS2) and the operating speed SPEED2 of the second electric machine 10 (determined by the second motor speed signal MS2). The first and second motor map 31, 32 are predefined and stored in the memory device 14. A chart 35 which is representative of the first and second motor maps 31, 32 is shown in FIG. 5. The chart 35 shows the power losses of the electric machines 7, 10 with reference to operating speed and torque. The first and second motor maps 31, 32 may be represented in three-dimensional look-up tables, for example arranged to represent the power loss PL1, PL2, the operating speed SPEED1, SPEED2 and the temperature TEMP1, TEMP2 along respective axis.

The TPC comprises the aggregate of the first and second power losses PL1, PL2. In the present embodiment, the TPC also comprises first and second power penalties PP1, PP2 calculated in respect of each of the first and second propulsion units 5, 6. The first and second power penalties PP1, PP2 are applied to provide a bias against activating either of the first and second electric machines 7, 10 if the operating temperature of that electric machine 7, 10 approaches a predetermined machine temperature threshold MT1, as illustrated in the first penalty table 33 shown in FIG. 5. The predetermined machine temperature threshold MT1 may, for example, correspond to a temperature above which the electric machine should be de-rated to avoid damage. A first mechanical power factor MP1 is calculated by multiplying the temporary front torque request TQ1_TEMP and the operating speed SPEED1 of the first electric machine 7. A first penalty factor W1 is derived from the first penalty table 33 in dependence on an operating temperature of the first electric machine 7. The first mechanical power factor MP1 and the first penalty factor W1 are multiplied together to determine the first power penalties PP1. A second mechanical power factor MP2 is calculated by multiplying the temporary rear torque request TQ2_TEMP and the operating speed SPEED2 of the second electric machine 10. A second penalty factor W2 is derived from the second penalty table 34 in dependence on an operating temperature of the second electric machine 10. The second mechanical power factor MP2 and the second penalty factor W2 are multiplied together to determine the second power penalty PP2. The first and second power losses PL1, PL2 and the first and second power penalties PP1, PP2 are aggregated to calculate the TPC for a given front and rear torque split. It will be understood that the first and second power penalties PP1, PP2 may be integrated into the first motor map 31 and/or the second motor map 32. For example, the first and second motor maps 31, 32 may be modified to include a penalty associated with the temperature of the respective first and second electric machines 7, 10 to bias the torque split away from one or other of said first and second electric machines 7, 10 as the operating temperature approaches the electric machine temperature threshold T1.

In a variant of the TPC calculation described herein, first and second motor maps may be identified for respective operating temperatures of the first and second electric machines 7, 10. The first and second motor maps may represent the power loss of each of the first and second electric machines 7, 10 based on their current operating temperatures. The first and second motor maps may be aggregated and the minimum power loss identified. The complementary temporary front and rear torque requests TQ1_TEMP, TQ2_TEMP corresponding to the minimum power loss may then be used to set the operating torque of the first and second electric machines 7, 10.

Power losses could include losses from other subsystems including mechanical drive units (differentials and gearboxes), inverters and related cooling systems. The need to cool a system could be taken into account for example, when ascertaining overall power cost in the system to operate an electric machine at a particular torque level and temperature.

It will be understood that the techniques described herein may be used to control the first and second electric machines 7, 10 when they are energized to generate a traction torque and/or a regenerative torque.

The first and second electric machines 7, 10 described herein may have the same ratings and operating characteristics. In this arrangement, the same motor maps 31, 32 and penalty tables 33, 34 may be used in the TPC calculation in respect of the first and second electric machines 7, 10. Since the temperature of the first and second electric machines 7, 10 may be different from each other, it will be understood that the calculations may be different for each of the first and second electric machines 7, 10. It will be understood that the first electric machine 7 may have different ratings and/or operating characteristics than those of the second electric machine 10. In this arrangement, different motor maps 31, 32 and/or penalty tables 33, 34 may be used in the TPC calculation in respect of the first and second electric machines 7, 10.

The invention has been described with reference to an embodiment in which the first and second electric machines 7, 10 are associated with front and rear axles 3, 4 of the vehicle 1. In a variant, the first and second electric machines 7, 10 may be associated with the same axle 3, 4. For example, the first and second electric machines 7, 10 may be arranged to transmit torque to opposing wheels W1-4 provided on the same axle 3, 4. The techniques described herein are equally applicable to this scenario.

The present invention has been described with reference to a vehicle 1 having first and second electric machines 7, 10. It will be understood that the vehicle 1 may comprise more than two (2) electric machines 7, 10. For example, the vehicle 1 may comprise three (3) electric machines or four (4) electric machines arranged to transmit torque to the front and rear axles 3, 4. The techniques described herein for calculating the TPC and determining the optimum torque split may be employed in these configurations.

It will be appreciated that various modifications may be made to the embodiment(s) described herein without departing from the scope of the appended claims.

The invention claimed is:

1. A controller for controlling at least first and second propulsion units to generate a combined torque at least substantially equal to a total requested torque, the controller comprising a processor configured to:
   determine at least first and second torque ranges for each of the at least first and second propulsion units, said at least first and second torque ranges being determined to maintain dynamic stability of the vehicle;
   determine a total power cost based on an estimated power loss of the at least first and second propulsion units within said at least first and second torque ranges;
   identify a minimum value of the determined total power cost;
   determine the torque to be generated by each of said at least first and second propulsion units corresponding to the identified minimum value of the total power cost; and
   generating at least first and second control signals for controlling said at least first and second propulsion units to generate the determined torque.

2. A controller as claimed in claim 1, wherein the processor is further configured to determine at least first and second power loss penalties based on current operating parameters of the at least first and second propulsion units.

3. A controller as claimed in claim 2, wherein the at least first and second propulsion units each comprise an electric machine, the processor being further configured to determine the at least first and second power loss penalties based on an operating temperature of the associated electric machine.

4. A controller as claimed in claim 3, wherein the processor is further configured to determine when the operating temperature of each electric machine increases above one or more predetermined temperature thresholds.

5. A controller as claimed in claim 2, wherein the total power cost is determined based on the estimated power loss and the power loss penalties of each of said at least first and second propulsion units.

6. A controller as claimed in claim 1, wherein the torque comprises an output torque and/or a regenerative torque.

7. A controller as claimed in claim 1, wherein the power loss of each of the at least first and second propulsion units is estimated based on one or more of the following set: an operating temperature; an operating speed; and a motor torque.

8. A controller as claimed in claim 1, wherein the processor is further configured to estimate the power loss of each of the at least first and second propulsion units at a plurality of intervals within the determined first and second torque ranges.

9. A controller for controlling at least first and second propulsion units to generate a combined torque at least substantially equal to a total requested torque, the first and second propulsion units comprising first and second electric machines respectively, the controller comprising a processor configured to:
   determine a first power loss penalty based on a first operating temperature of the first electric machine;
   determine a second power loss penalty based on a second operating temperature of the second electric machine;
   determine a total power cost based on the first and second power loss penalties;
   identify a minimum value of the determined total power cost;
   determine the torque to be generated by each of said at least first and second propulsion units corresponding to the identified minimum value of the total power cost; and
   generating at least first and second control signals for controlling said at least first and second propulsion units to generate the determined torque.

10. A controller as claimed in claim 9, wherein the processor is further configured to determine when the operating temperature of each electric machine increases above one or more predetermined temperature thresholds.

11. A controller as claimed in claim 9, wherein the power loss of each of the at least first and second propulsion units is estimated based on the operating temperature and an operating speed.

12. A controller as claimed in claim 9, wherein the processor is further configured to:
   determine at least first and second torque ranges for each of the at least first and second propulsion units, said at least first and second torque ranges being determined to maintain dynamic stability of the vehicle; and
   determine an estimated power loss of the at least first and second propulsion units within said at least first and second torque ranges;
   wherein the total power cost is determined based on the first and second power loss penalties and the estimated power loss within said at least first and second torque ranges.

13. A controller as claimed in claim 12, wherein the processor is further configured to estimate the power loss of each of the at least first and second propulsion units at a plurality of intervals within the determined first and second torque ranges.

14. A controller as claimed in claim 9, wherein the processor is further configured to estimate a power loss of each of the at least first and second propulsion units for each of a plurality of transmission drive ratios for one or more of said at least first and second propulsion units.

15. A controller as claimed in claim 14, wherein the processor is further configured to select a transmission drive ratio for one or more of said at least first and second propulsion units to provide the minimum total power cost.

16. A controller as claimed in claim 9, wherein the power loss of the at least first and second propulsion units is estimated based on a respective power loss map.

17. A vehicle comprising a controller as claimed in claim 9.

18. A method of controlling at least first and second propulsion units to generate a combined torque at least substantially equal to a total requested torque, the method comprising:
   determining at least first and second torque ranges for each of the at least first and second propulsion units, said at least first and second torque ranges being determined to maintain dynamic stability of the vehicle;
   determining a total power cost based on an estimated power loss of the at least first and second propulsion units within said at least first and second torque ranges;
   identifying a minimum value of the determined total power cost;
   determining the torque to be generated by each of said at least first and second propulsion units corresponding to the identified minimum value of the total power cost; and
   controlling said at least first and second propulsion units to generate the determined torque.

19. A non-transitory computer-readable medium having a set of instructions stored therein that, when executed, cause a processor to perform the method claimed in claim 18.

* * * * *